US010357750B2

(12) United States Patent
Carbone, II et al.

(10) Patent No.: US 10,357,750 B2
(45) Date of Patent: Jul. 23, 2019

(54) APPARATUS, METHOD AND SYSTEM FOR CALIBRATING A LIQUID DISPENSING SYSTEM

(71) Applicant: ECOLAB USA INC., Saint Paul, MN (US)

(72) Inventors: Henry L. Carbone, II, Saint Paul, MN (US); Richard J. Mehus, Saint Paul, MN (US); Kevin C. Tauer, Saint Paul, MN (US); Anatoly Skirda, Saint Paul, MN (US); Eugene Tokhtuev, Saint Paul, MN (US); William M. Christensen, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 15/695,786

(22) Filed: Sep. 5, 2017

(65) Prior Publication Data
US 2017/0368520 A1    Dec. 28, 2017

Related U.S. Application Data

(63) Continuation of application No. 14/053,803, filed on Oct. 15, 2013, now Pat. No. 9,751,059, which is a
(Continued)

(51) Int. Cl.
*B01F 15/00*    (2006.01)
*G01F 3/10*    (2006.01)
(Continued)

(52) U.S. Cl.
CPC .......... *B01F 15/00259* (2013.01); *G01F 3/10* (2013.01); *G01F 15/063* (2013.01); *G01F 25/0007* (2013.01)

(58) Field of Classification Search
CPC ........ B01F 15/00259; B01F 15/00123–00188; G01F 15/063; G01F 25/0007; G01F 3/10
(Continued)

(56) References Cited

U.S. PATENT DOCUMENTS

| 587,589 A | 8/1897 | Linquist |
| 4,831,866 A | 5/1989 | Forkert et al. |

(Continued)

FOREIGN PATENT DOCUMENTS

| CN | 201163204 Y | 12/2008 |
| EP | 0147004 | 7/1985 |

(Continued)

OTHER PUBLICATIONS

ECOLAB USA Inc, European Search Report related to EP Application No. 13169182, dated Aug. 28, 2014.

(Continued)

*Primary Examiner* — Robert R Raevis
(74) *Attorney, Agent, or Firm* — McKee, Voorhees & Sease, PLC

(57) ABSTRACT

An apparatus, method and system providing for calibration and/or control of a liquid dispensing system is disclosed. The hand-held calibration auditing tool includes a flow meter (36-37) with inlets adapted for quick connection to one or more liquid inputs to a liquid dispensing system (10). A sensor (94-95) having a data output of liquid flow information for a liquid input to the dispensing system (10) is operably connected to a controller (12) to receive the liquid flow information for the liquid input. The controller (12) provides a dilution rate and other liquid flow information for a liquid product input to a dispenser.

10 Claims, 8 Drawing Sheets

Related U.S. Application Data continuation of application No. 13/194,333, filed on Jul. 29, 2011, now Pat. No. 8,590,362.

(60) Provisional application No. 61/369,510, filed on Jul. 30, 2010.

(51) Int. Cl.
*G01F 15/06* (2006.01)
*G01F 25/00* (2006.01)

(58) Field of Classification Search
USPC .... 222/23–51, 154–159; 73/1.01, 1.16–1.36, 73/866
See application file for complete search history.

(56) References Cited

U.S. PATENT DOCUMENTS

| | | |
|---|---|---|
| 4,845,965 A | 7/1989 | Copeland et al. |
| 4,981,024 A | 1/1991 | Bedham |
| 5,217,288 A | 6/1993 | Johnson |
| 5,806,716 A | 9/1998 | Vogt |
| 6,098,646 A | 8/2000 | Hennemann |
| 6,453,257 B1 | 9/2002 | Juhasz |
| 6,845,886 B2 | 1/2005 | Henry |
| 7,472,609 B1 | 1/2009 | Larson et al. |
| 7,523,660 B2 | 4/2009 | Albrecht et al. |
| 8,240,514 B2 | 8/2012 | Livingston et al. |
| 9,751,059 B2 * | 9/2017 | Carbone, II .............. G01F 3/10 |
| 2001/0000282 A1 | 4/2001 | Poleshuk et al. |
| 2006/0283877 A1 | 12/2006 | Bodemann |
| 2008/0295568 A1 * | 12/2008 | Nanaji .................. B67D 7/085 73/1.34 |
| 2011/0094287 A1 | 4/2011 | Nanaji et al. |
| 2012/0041605 A1 | 2/2012 | Legatt |
| 2016/0114301 A1 | 4/2016 | Jablonski |

FOREIGN PATENT DOCUMENTS

| | | |
|---|---|---|
| JP | 2002006345 | 1/2002 |
| JP | 2002114296 | 4/2002 |
| JP | 2009532108 A | 9/2009 |

OTHER PUBLICATIONS

ECOLAB USA Inc, International Search Report related to PCT/IB2011/053394 (11 pages), dated Mar. 9, 2012.

* cited by examiner

APPARATUS, METHOD AND SYSTEM FOR CALIBRATING A LIQUID DISPENSING SYSTEM

CROSS-REFERENCE TO RELATED APPLICATIONS

This application is a Continuation application of U.S. Ser. No. 14/053,803, filed on Oct. 15, 2013, which is a Continuation application of U.S. Ser. No. 13/194,333, filed Jul. 29, 2011, now U.S. Pat. No. 8,590,362, issued on Nov. 26, 2013, which is a non-provisional application of Ser. No. 61/369,510, filed Jul. 30, 2010, all of which are hereby incorporated by reference in their entirety.

BACKGROUND OF THE INVENTION

1. Field of the Invention

This invention relates generally to a method, apparatus and system for calibrating a liquid dispensing system, and more particularly to a method, apparatus and system for accurately calibrating, auditing and controlling dilution of a liquid product dispensed from a liquid dispensing system during installation and over the operational life of the dispensing system.

2. Description of Prior Art

Many cleaning and sanitizing processes, whether laundering, warewashing or the like, have as a significant portion of their operating costs the expense of the formulated aqueous products they use. Furthermore, the effectiveness of most, if not all, cleaning and sanitizing processes is inextricably linked to supplying a calibrated or measured amount of a formulated aqueous product to the process. Too little product can impair the effectiveness of a cleaning and/or sanitizing process. Too much product can result in significant waste and adds unnecessary operating expenses to a business. For example, hospitality businesses such as hotels, hospitals, restaurants, and the like use liquid detergents and cleaning solutions for laundry and warewashing. These processes require proper formulation of the solutions to prevent waste and increase the effectiveness of the cleaning and sanitizing process. To achieve these objectives, many efforts have been made to calibrate, control and measure the dilution and delivery of concentrated liquid products during set-up and over the operational lifecycle of the dispenser. Current calibration and auditing techniques for a dispenser require the use of graduated liquid collection devices or scales, and multiple iterations of testing to calculate a dilution ratio to properly calibrate and audit the dispenser. These processes also often directly expose the individual conducting the calibration or audit to concentrated chemicals The present invention addresses these problems and provides for an apparatus, method and system for quickly connecting a flow meter in-line to a liquid input of a dispenser for communicating liquid flow data to a controller for displaying a dilution ratio for accurately calibrating and auditing a liquid dispensing system.

In addition, the present invention addresses the real-time monitoring of liquid product dispensing, including the rate, volume, calibration and auditing of the liquid product being dispensed to insure the correct dilution ratio is consistently being achieved.

The present invention also addresses the use of real-time and historical liquid flow data, whether raw or processed, for assessing current and future use of the dispenser, liquid product effectiveness, and business decisions relating to a dispensing account.

BRIEF SUMMARY OF THE INVENTION

In one embodiment, the invention is a hand held tool for calibrating and auditing a liquid dispensing system. The tool includes a flow meter having an inlet with a connector adapted for connecting the inlet of the flow meter in-line to one or more liquid inputs to a liquid dispensing system and a sensor having a data output of liquid flow information for a liquid input to the dispensing system. In a preferred form, the tool includes a first flow meter having an inlet with a quick-connector adapted for connecting the inlet of the first flow meter in-line to a first liquid input, such as a liquid product, of the liquid dispensing system, and a second flow meter having an inlet with a quick-connector adapted for connecting the inlet of the second flow meter in-line to a second liquid input, such as a liquid diluent, of the liquid dispensing system and a controller operably connected to each flow meter to receive liquid flow information for a liquid input. The tool also may include dampening means, such as a bladder, a length of flexible wall tubing, and/or a check valve at the outlet of the flow meter.

In another embodiment, the invention is a liquid dispensing system. The dispensing system includes a dispenser having at least one liquid input connected in fluid communication to a liquid product and another liquid input connected in fluid communication to a liquid diluent. A flow meter is connected in fluid communication to each liquid input of the dispenser. The flow meter has a sensor with a data output of liquid flow information for each liquid input to the dispensing system. A controller is operably connected to the data output of the sensor to receive the liquid flow information for each liquid input and display a dilution ratio for the liquid product. At least one of the flow meters may include pulse dampening means to minimize in-line pressure pulses.

In another embodiment, the invention is a method for calibrating and auditing a liquid dispensing system. The method includes the step of taking a device in-hand having a flow meter operably connected to a controller. An inlet of the flow meter is removably connected in-line with a liquid input to the dispensing system. The dispensing system is operated and liquid flow information is acquired from the flow meter for the liquid input. In a preferred form, the device includes a first and second flow meter and the step of removably connecting an inlet of the first flow meter to a liquid product input and
an inlet of the second flow meter to a liquid diluent input. The system may be calibrated using measured liquid flow information. For example, a dilution ratio is calculable using liquid flow information from the first and second flow meters.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings, and which:

DETAILED DESCRIPTION OF THE PREFERRED EMBODIMENTS

Figure 1A:
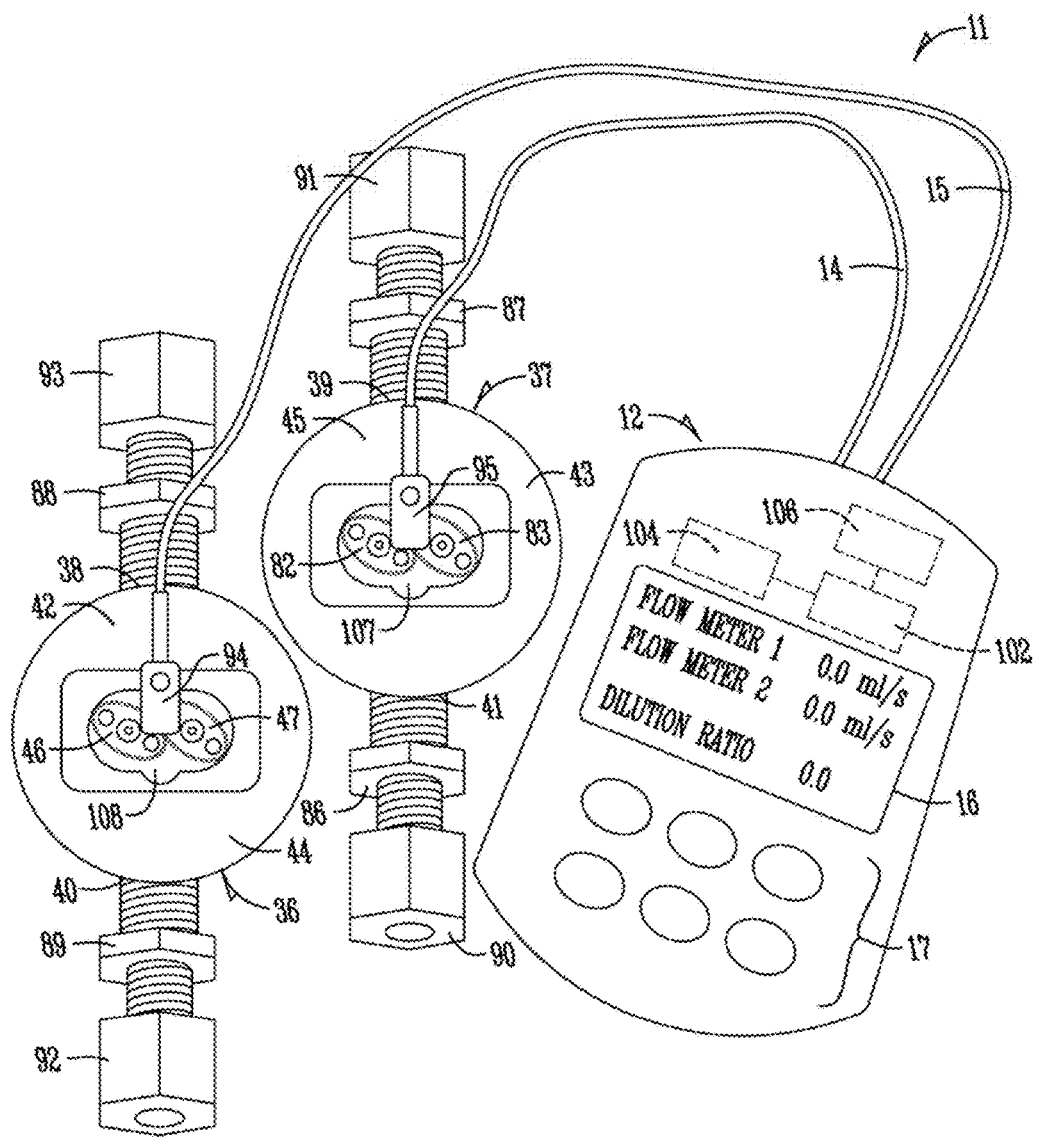
FIG. 1A is a schematic representation of the present invention.
Figure 1B:
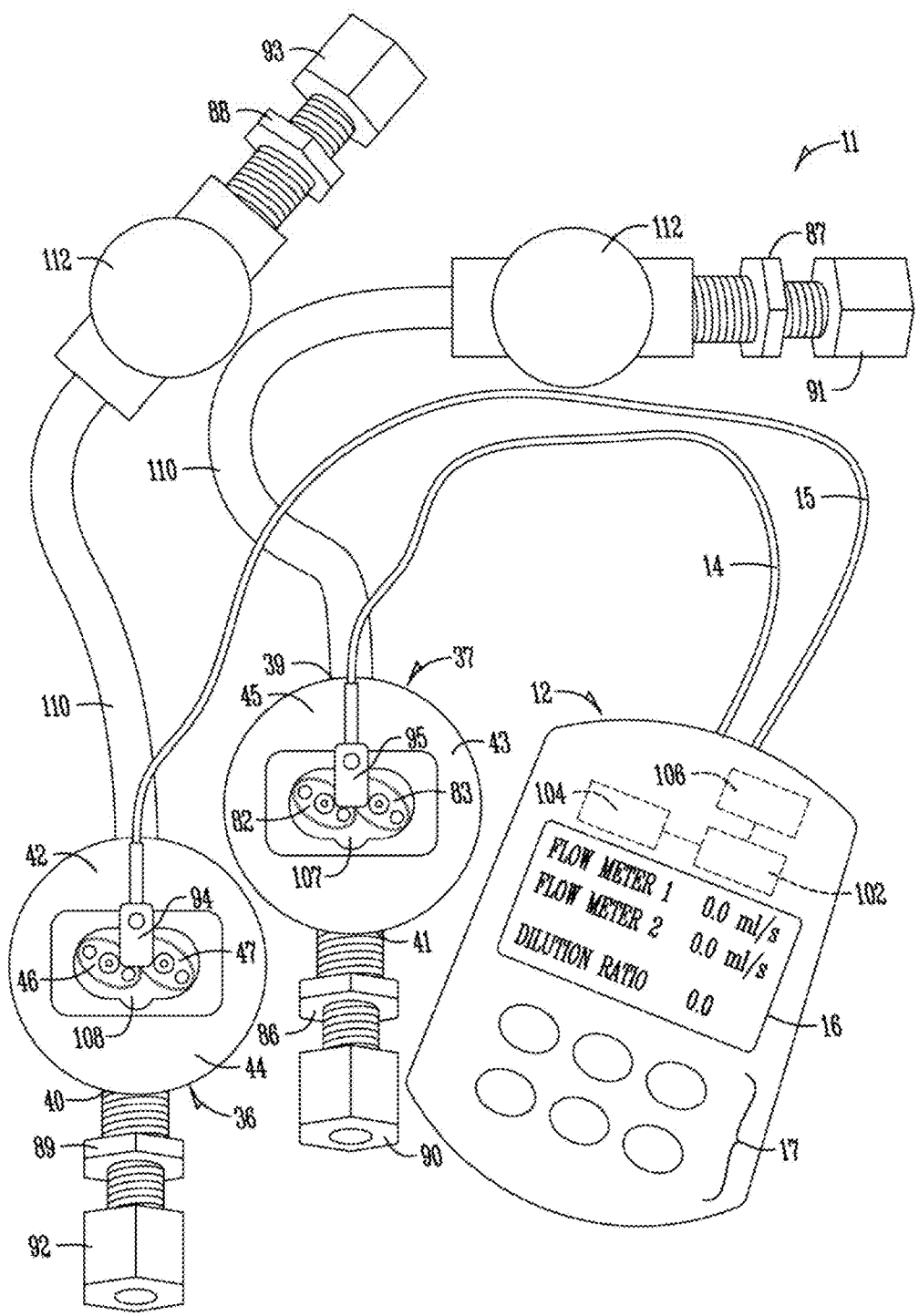
FIG. 1B is a schematic representation of another aspect of the invention shown in FIG. 1A.

Referring to the drawings, wherein like numerals represent like parts throughout the several views, there is generally disclosed at 11 a hand-held tool for calibrating and auditing a liquid dispensing system 10. The tool 11 includes generally a pair of flow meters operably connected to a controller 12. The controller 12 could be configured to any number of flow meters. As illustrated in FIGS. 1A-B, tool 11 includes generally a pair of flow meter assemblies 36-37. Each flow meter assembly includes a flow meter 42-43. Flow meters 42-43 are preferably an oval gear meter. However, it is understood that other suitable flow meters may also be utilized. Other potentially suitable types of flow meters include an orifice-square edge, orifice-conic edge, venturi, pitot tube, electromagnetic, turbine, ultrasonic-transient time, Doppler, rotometer, vortex, or coriolis flow meter. Of the oval gear meter type, flow meters 42-43 may be configured to acquire liquid flow information from liquid passing through the cavity 107-108 of the body 44-45 of each respective flow meter by magnetic pulse count or optical pulse count. A similar oval gear flow meter using magnetic pulse count is disclosed in application Ser. No. 11/916,785 entitled "OVAL GEAR METER" filed on Jun. 8, 2005 and issued Apr. 28, 2009 as U.S. Pat. No. 7,523,660, which is hereby incorporated by reference in its entirety. Likewise, a similar oval gear meter using optical pulse count for capturing or acquiring liquid flow information is disclosed in application Ser. No. 12/369,501 entitled "FLOW METER" filed on Feb. 11, 2009 and is hereby incorporated by reference in its entirety.

Figure 2A:
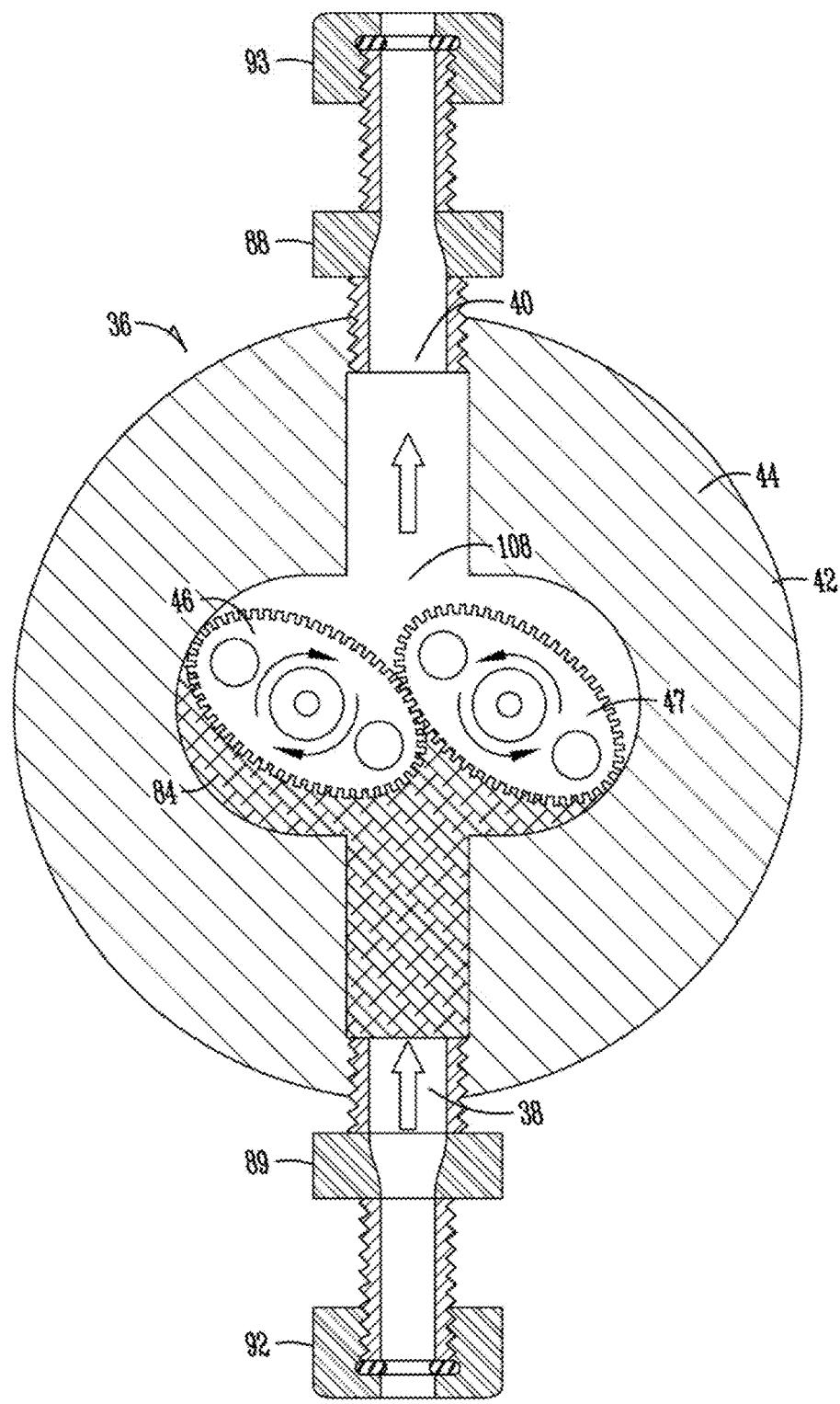
FIG. 2A is a cross-sectional view of the flow meter shown in FIG. 1A.
Figure 2B:
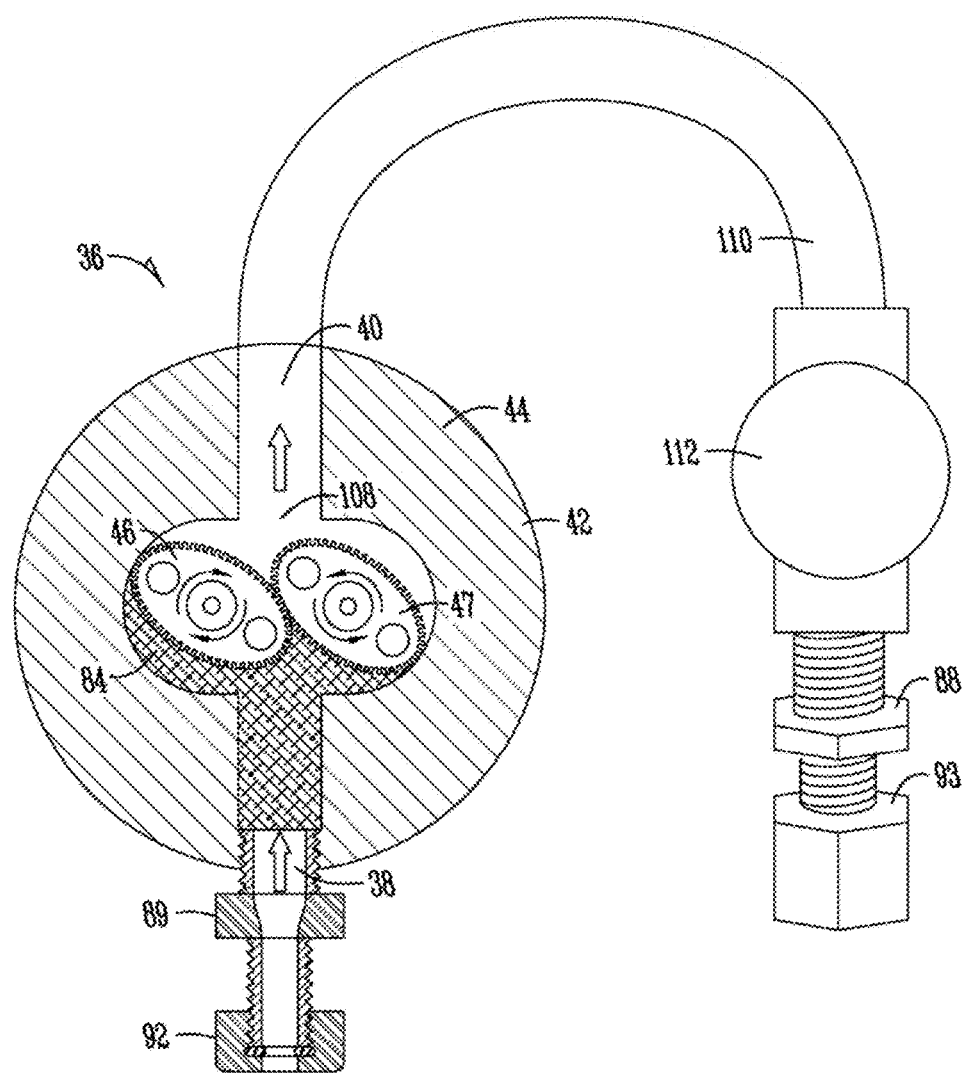
FIG. 2B is a cross-sectional view of the flow meter shown in FIG. 1B.
Figure 2C:
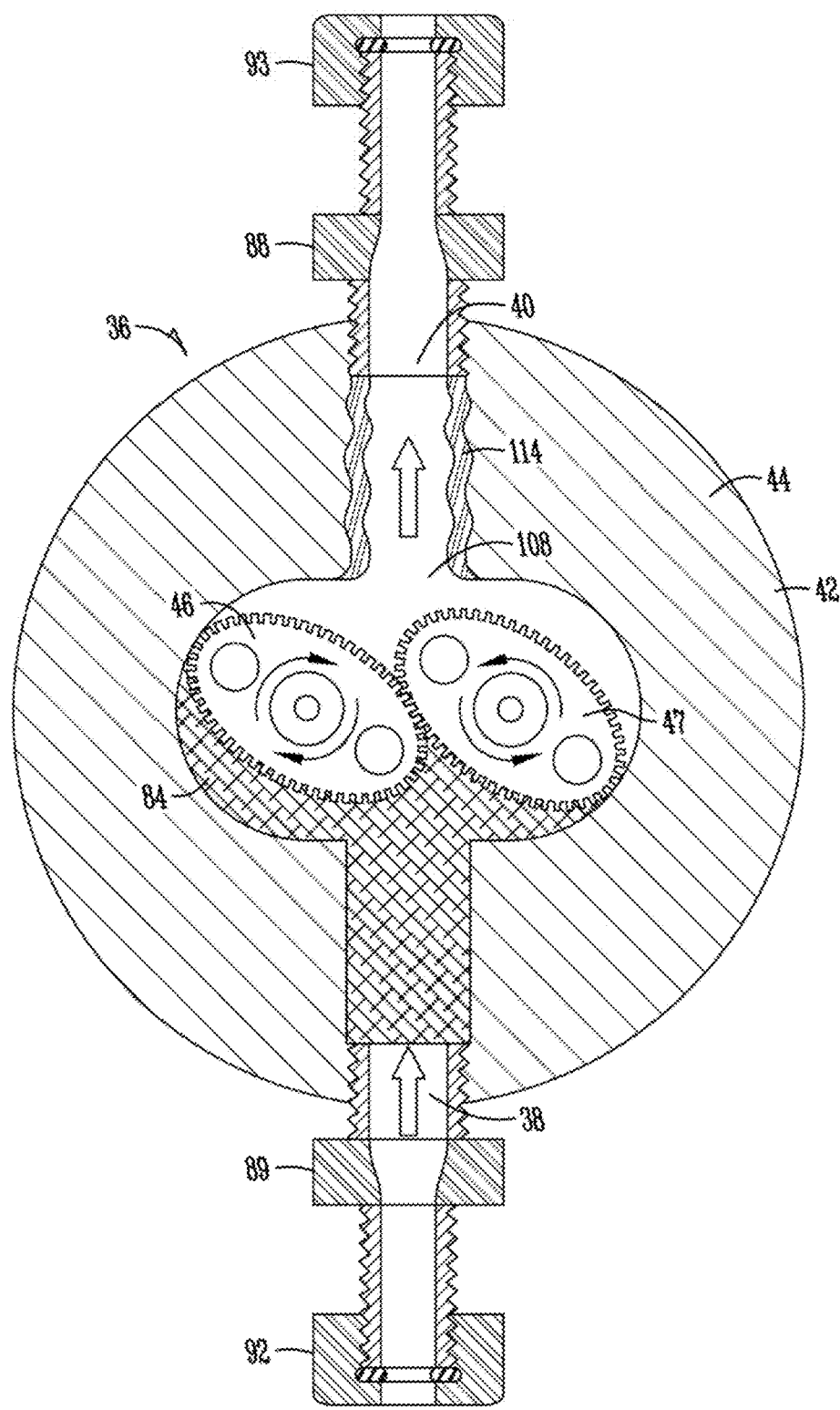
FIG. 2C is a cross-section view illustrating another aspect of the flow meter shown in FIG. 2A.

As shown, each flow meter 42-43 includes a body 44-45. Within the body 44-45 of each flow meter 42-43 are rotors 46-47 as best illustrated in FIGS. 2A-C. The pair of rotors 46-47 are positioned between the inlet 38 and outlet 40. Within the flow meter body 44 and created between each rotor 46-47 are compartments 84 configured to trap a very precise volume of fluid between the outer oval shape of rotors 46-47 and the inner chamber wall of the flow meter body 44. The trapping of a precise volume of liquid in the compartment 84 allows flow meter 42 to operate as a positive displacement flow meter. The flow meter operates by repeatedly filling and emptying compartment 84 of a known volume of a liquid. The flowrate is then calculated based on the number of times these compartments 84 are filled and emptied. The design of the oval gear flow meter 42, as previously described, allows the oval shaped gear-toothed rotors 46-47 to rotate within the flow meter body 44 having a specified geometry. As these rotors 46-47 turn, they sweep out and trap a very precise volume of fluid between the outer oval shape of the rotors 46-47 and the inner chamber walls with none of the fluid actually passing through the gear teeth. An oval gear meter is ideally suited for measurement of viscous fluids or those with varying viscosities. While the flow meter 42 illustrated in FIGS. 2A-C is preferred to be used with the present invention, it is understood that other suitable flow meters may also be utilized, such as those described above and incorporated herein by reference.

Each flow meter 42-43 also includes a sensor 94-95. Suitable sensors, whether optical or magnetic, are described in U.S. Pat. No. 7,523,660 and application Ser. No. 12/369,501 noted above. Sensors 94-95 acquire liquid flow information from the rotors 46-47 shown in FIGS. 2A-C. Each sensor 94-95 includes a connection 14-15 to the controller 12. The connection 14-15 may be a wired or wireless connection. For example, controller 12 may include a transmitter and/or receiver for receiving liquid flow information from flow meters 42-43 and communicating liquid flow information to another device or intermediary data storage location. In the case where flow meters 42-43 require a power source, the wired connection 14-15 to controller 12 may be used to support the electrical needs of any device aboard the flow meter assembly 36-37 (such as sensors 94-95). A power source may also be configured into each flow meter assembly 36-37 for powering any electrical needs of the flow meter assembly. For example, each flow meter assembly 36-37 may be an "active device" electrically powered by an on-board power source such as a battery. In another embodiment, each flow meter 42-43 may be a passive device that is powered from a source external to the flow meter 42-43, or the tool 11, and thereby would not require power from another source to operate.

In the configuration shown for tool 11 illustrated in FIGS. 1A-B, liquid flow information is communicated from each flow meter 42-43 to controller 12 via wired connectors 14-15. Each flow meter assembly 36-37 also includes fittings for quickly connecting them in-line to an existing conduit or an input line of a dispensing system. One type of quick-connect fitting is illustrated in FIGS. 1A-B. Other quick-connect fittings are contemplated as circumstances may suggest or are rendered expedient by incorporation of or use of the present invention in combination with various dispensing systems. Various fittings and other quick-connectors are available commercially and suitable for use in quickly attaching and removing each flow meter assembly 36-37 from an "in-line" position to an "out-of-line" position relative to a conduit or other liquid carrying member of a dispensing system. For example, as shown in FIGS. 1A-B, the inlet 38-39 and/or the outlet 40-41 of each flow meter assembly 36-37 may be configured with fittings 86-89. Each fitting 86-89 has a first end that is inserted into the inlet 38-39 such as by threading the first end into the inlet. The fittings 86-89 also include a second end, such as a threaded end, adapted for receiving, by threads, a quick connector 90-93. A liquid carrying member, such as a conduit, is inserted into the second end of fittings 86-89 and the quick connector 90-93 is threaded onto the second end. The conduit is sealed to the fitting as the quick connector 90-93 is threaded onto the fitting. For example, a compression seal ring may be used to seal the conduit to the fitting. These types of fittings are commonly known and commercially available. In this manner, the inlets 38-39 and/or outlets 40-41 may be quickly connected in-line with an existing liquid carrying member such as a conduit, hose, tubing or pipe of a dispensing system. Those skilled in the art can appreciate that the quick connectors or fittings being contemplated are not limited to threaded unions but may include other attachment interfaces, such as a quick coupler union, a compression fit union, a slip joint union, a gasket fit union, or any other connection union having the structure to permanently or temporarily hold cooperating attachment interfaces together, such as the inlets 38-39 and/or outlets 40-41 of each flow meter assembly 36-37 with a liquid carrying member, such as conduit, hose or pipe.

FIGS. 1B and 2B-C illustrate other possible aspects of the present invention that may be included with a flow meter assembly. In one aspect, one or both flow meter assemblies 36-37 may include a length of flexible tubing 110 connected at the outlet. The tubing 110 is preferably constructed of thin, flexible walls so as to allow in-line pressure changes, specifically back pulses, to be absorbed by the tubing to prevent or minimize the in-line pressure changes from reverse rotating the rotors 46-47 and 82-83. For example, in-line pressure changes can result from a pressure or pump source that is used to move liquid through a dispensing system. In one embodiment, the tubing 110 is preferably a low (e.g., 44-55 durometer hardness) durometer tubing of sufficient length (e.g., roughly six inches) to absorb in-line back pulses by providing minimal resistance to tube compression. The tubing 110 may be connected at the outlet 38-39 of the flow meter assembly. The opposite end of the tubing 110 may be connected in-line with an existing liquid carrying member such as a conduit, hose, tubing or pipe of a dispensing system using the fittings 86-89 and connectors 90-93. Alternatively, the opposite end of the tubing 110 may be connected to a check valve 112. The check valve 112 is configured to prevent liquid from flowing backwards through the flow meter assemblies 36-37 as a result of inconsistent line pressure, such as from a back pulse. Since the check valve 112 is not always quick enough to entirely prevent a back pulse from reaching the meter, the tubing 110 further dampens what the check valve 112 misses. In this manner, the tubing 110 and check valve 112 work together to prevent in-line pressure inconsistencies, such as a back pulse, from reaching the meter and reverse-rotating the rotors. As best illustrated in FIG. 2B, one end of the check valve 112 may be configured with fittings 86-89 and connectors 90-93 to be connected in-line with an existing liquid carrying member such as a conduit, hose, tubing or pipe of a dispensing system. In another aspect of the present invention as shown in FIG. 2C, the flow meter assembly 36-37 may include a bladder 114 or a belt at the outlet of the cavity 107-108 to absorb inconsistent line pressures, such as a back pressure pulse. The bladder 114 or belt may be constructed of ultra-soft tubing (e.g., ultra-low or low durometer tubing) or a thinned membrane so that it provides minimal resistance to compression, and thereby absorbs pressure that might otherwise reverse-rotate the rotors 46-47.

Controller 12 is operably configured to provide data storage, communication and processing. Data in the form of liquid flow information is received from each flow meter assembly 36-37. The liquid flow information is preferably reported to the controller 12 from each flow meter assembly 36-37 in units such as a volume per unit of time (i.e., volumetric flow). Given that each dispensing system has both liquid inputs and liquid outputs with varying liquid flowrates, each flow meter assembly 36-37 may be specifically configured for a measuring a certain volumetric flowrate. This includes measuring flow rate, total consumption, and other parameters associated with any liquid or liquidized flow. Any of the aforementioned measurements may also be electronically date time stamped for purposes of analyzing measurements. For example, a high volume flow meter may be used to connect in-line to the liquid diluent line of a dispenser whereas a lower volume flow meter may be used to connect in-line to the liquid product line of a dispensing system.

The controller 12 is also preferably configured to identify the type of flow meter (e.g., flowrate for the meter) connected to the controller 12. In one embodiment, connectors 14-15 are configured with a pin-out having a specific number of pin connectors depending upon the type of flow meter being connected to the controller 12. Alternatively, connectors 14-15 may have a different configuration for the pin-out. For example, a connector with 4 pins could only have two wires. Wires going to pins 1 and 2 would be a different flow meter than the one with wires going to pins 2 and 3, or 3 and 4, etc. Altering the configuration of the wired pins enables one common connector to be used to differentiate between multiple size gear meters. Thus, depending upon the number of pins in the pin-out, the controller automatically recognizes the type of meter and its flowrate and sensitivity parameters. Auto recognition of the type of flow meter, flowrate and sensitivity parameters for the flow meter may be used to tag liquid flow information received from each of the flow meter assemblies 36-37 at controller 12.

The controller 12 also includes a display 16 with controls 17. The display 16, such as an LCD, is configured to apprise the operator of at least such information as the flowrate for each flow meter assembly 36-37 and the dilution ratio for a liquid product flowing through one of the meters. Through the display 16 a user may also be apprised of the flowrate for the liquid diluent or product flowing through each meter 36-37. Inputs from a user are received through controls 17 for controlling information provided on display 16, data processing and data storage protocol and procedures. Controls 17 may also be provided for managing transfer of liquid flow information from the controller 12 or pair of flow meter assemblies 36-37 to other electronic devices, such as a PC. The controller 12 is preferably also configured with a processor 102 operably connected to a data store 104 and a data link 106. Liquid flow information received from the pair of flow meter assemblies 36-37 may be saved in the data store 104 along with date time stamp information for the recorded data. The liquid flow information may also be processed by processor 102 to provide and display information to the operator via display 16. Liquid flow information in the data store 104 or processed by processor 102 may be communicated to another device or location for further inspection, study or processing using data link 106. Data link 106 may include a transmitter and a receiver for transmitting data and receiving data from another electronic device or network. Acquired liquid flow information may be communicated in real-time to permit real-time monitoring of a dispensing system or account. For example, liquid flow information acquired by the flow meters 36-37 for a dispensing system or account may be communicated back to business providing the dispensing equipment and product to the account to control, monitor, audit, calibrate, and assess the account in real-time. Such information may then be used to service, calibrate, repair and/or upgrade the equipment, as well as monitor the use of product. This information may also be shared with the business using the dispensing equipment and product to make decisions regarding the same. Data link 106 may also include a connector such as a USB port for connecting controller 12 to another electronic device via a USB cable or other data carrier. The controller 12 may include one or more electro-chemical cells such as a depletable or rechargeable battery cell for powering the electronics aboard the controller. The tool 11 may be configured so that the flow meter assemblies 36-37 and the controller 12 with connectors 14-15 can be operably stored within a carrying case to allow the tool 11 to be totally portable between liquid dispensing accounts. The present invention contemplates that device 12 can be also a PC (for example, a tablet PC, a notebook or even desktop PC) or a smartphone having a device-specific program or application. In such a configuration, the sensors 94-95 can be equipped with a microcontroller to convert sensor data to a digital data to transfer it to a PC, using, for example USB ports, or wireless transmission. The PC can have corresponding software to transform the data acquired from the sensors to a flowrate and a dilution ratio data and present them on the PC screen.

Figure 3:
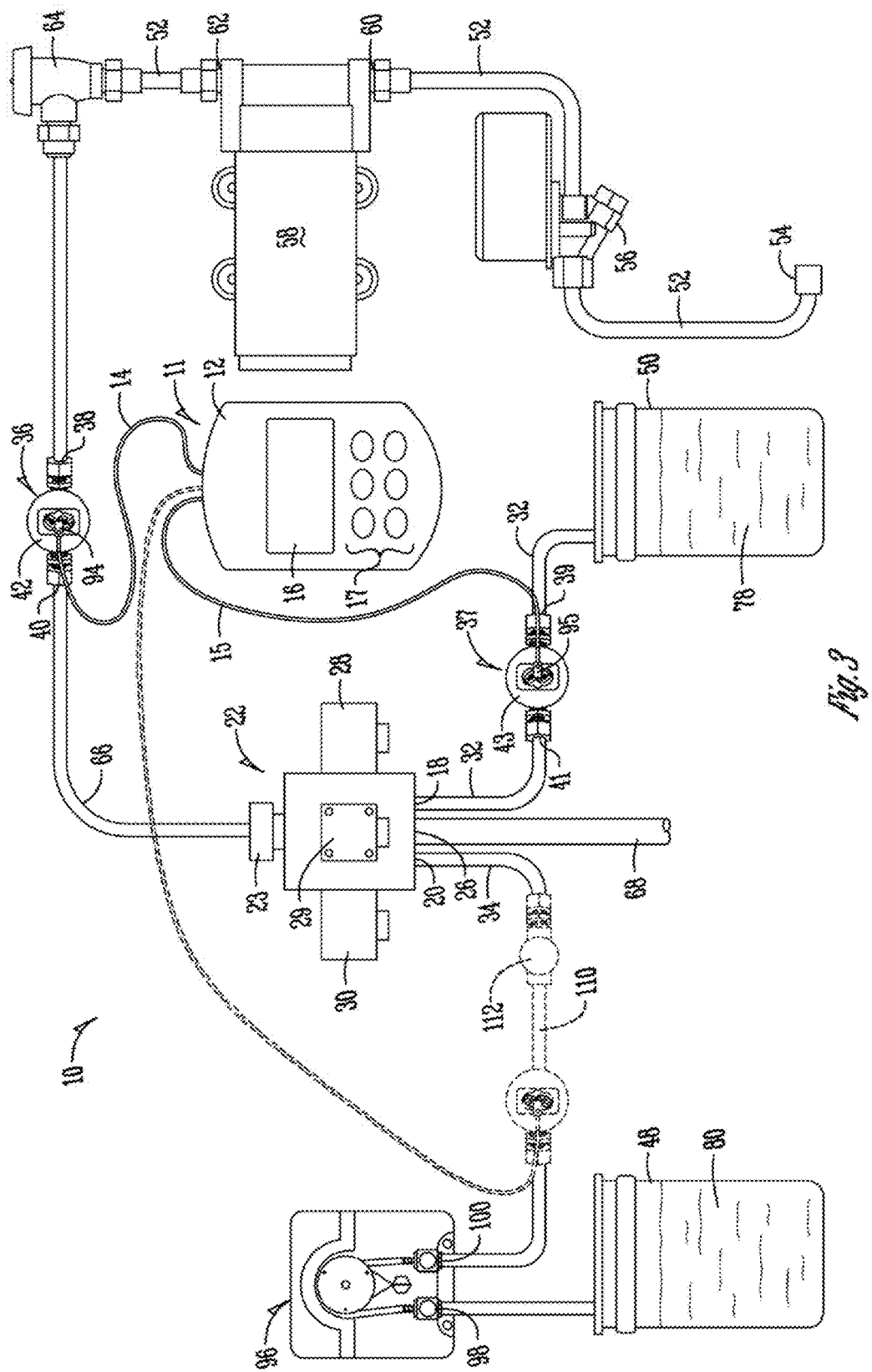
FIG. 3 is a schematic representation of the present invention and a dispensing system.
Figure 4A:
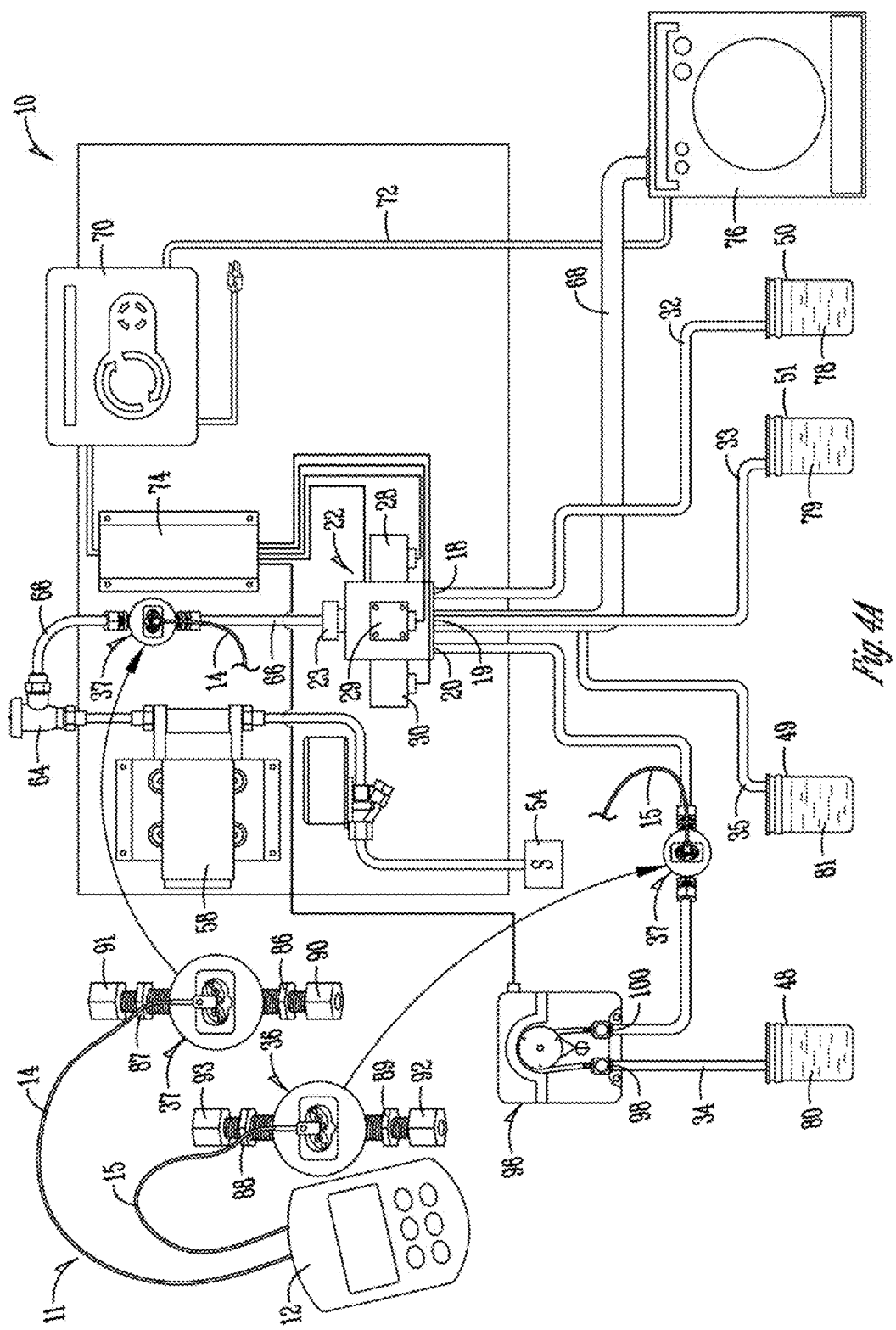
FIG. 4A is a schematic representation of the present invention shown in a commercial laundry system.
Figure 4B:
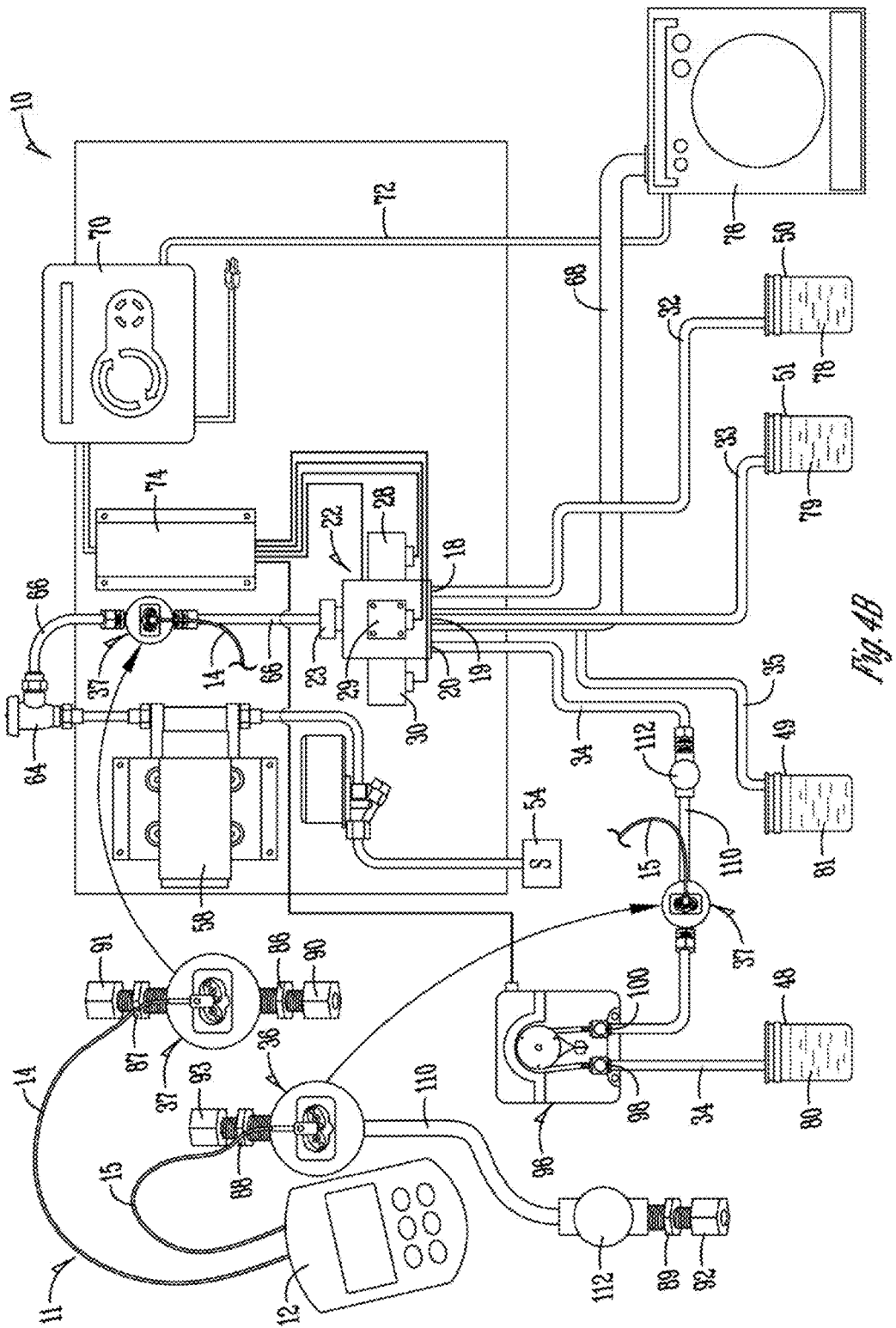
FIG. 4B is a schematic representation of another aspect of the present invention shown in a commercial laundry system.

Existing liquid dispensing systems, such as dispensing system 10 illustrated in FIGS. 3 and 4A-B, all include one or more liquid inputs to a dispenser. The liquid inputs to the dispenser generally range from varying liquid product types that may or may not be diluted by a liquid diluent input to the dispenser. Existing devices, systems and methods for verifying the accuracy of the dispenser, such as the dilution rate of a liquid product, currently require a lot of resources and time for calibrating and performing continuing audits of the dispensing system over time. The tool 11 of the present invention is ideally suited for quickly connecting in-line with conduit or tubing, including an existing device or feature of a dispenser, for performing a quick calibration and performing continuing audits of the dispenser over time. The tool 11 is also ideally suited for semi-permanent or permanent installation into a dispensing system. Numerous types of dispensing systems currently exist and are contemplated herein. For example, aspirated dispensers provide a means for dispensing liquid inputs to an end use process such as an appliance. Further details and written description of the various features, functions and structure of an aspirating dispensing system are disclosed in application Ser. No. 11/206,618 entitled "METHOD AND APPARATUS FOR DISPENSING A USE SOLUTION" filed on Aug. 18, 2005 and incorporated herein by reference in its entirety. Other dispensers are also contemplated. For example, dispensers configured to dispense based on weight, flow, unit volume or unit count are contemplated as a type of dispensing system that tool 11 could be used to provide calibration, monitoring and on-going audits of the dispenser over time. For example, the tool 11 of the present invention could be used to monitor, calibrate and audit a dispensing system that breaks down a solid to a liquid product, dilutes a concentrate to a liquid product, dissolves a tablet to a liquid product, or dispenses a liquid product directly from a source. The tool 11 can be a portable device, or may be integrated into an existing or contemplated dispensing system as described above. FIG. 3 illustrates the tool 11 shown in FIG. 1A being integrated into the dispensing system 10. The tool 11 shown in FIG. 1B could also be integrated into the dispensing system 10 shown in FIG. 3. FIGS. 4A-B illustrate tool 11 shown in FIGS. 1A-B respectively being used as a portable device for calibrating and auditing the dispensing system 10.

The dispensing system 10 illustrated in FIG. 3 includes a dispenser 22. The dispenser 22 includes four solenoid valves 28-31 (solenoid valve 31 not shown). The dispenser 22 also includes several liquid inputs. For example, the dispenser 22 may include four liquid product inlet ports 18-21 (product inlet ports 19 and 21 are not shown). Each product inlet port 18-21 of dispenser 22 is connected in fluid communication to a liquid product source such as a liquid product container 48-51 (liquid product container 49 and 51 not shown). Each liquid product inlet port 18-21 of dispenser 22 is connected in fluid communication to liquid product containers 48-51 via a liquid product conduit 32-35 (liquid product conduit 33 and 35 not shown). Flow meter assembly 37 is connected in-line to liquid product conduit 32. Flow meter assembly 37 is also connected to controller 12 by connection 15.

Water or other suitable diluents provided by a water or diluent source 54, is delivered under a source pressure by a suitable pressure to a water intake conduit 52. The source pressure is typically from 30 psi to 50 psi. A suitable water solenoid 56 is placed in the flow path of conduit 52 and may be utilized to open and close the flow of the water through the conduit. The intake conduit 52 may be connected in fluid communication to an inlet 60 of a boost pump 58. The boost pump 58 may be used to raise the pressure of the water or diluent from the source pressure to a suitable elevated pressure. The outlet 62 of the boost pump is connected in fluid communication to the inlet 23 of dispenser 22 via conduit 66 with an anti-siphon valve 64 typically positioned in-line in the flow path of conduit 66. Flow meter assembly 36 is also positioned in-line in the flow path of conduit 66 as shown. Flow meter assembly 36 is connected to controller 12 via connection 14. Solenoid valve 56 is activated to allow water or the diluent to flow at the source pressure to the boost pump where it may then be elevated in pressure and enters the dispenser 22. In the case where dispenser 22 is an aspirating dispenser, the inlet 23 is connected in fluid communication to a passageway (not shown) within the dispenser 22. Product inlet ports 18-21 (and two not shown) are moved into fluid communication with the passageway (not shown) within the dispenser 22 by activation of solenoid valves 28-31 (solenoid valve 31 not shown). The dispenser 22 includes an outlet port 26 connected in fluid communication to the passageway. The dispenser 22 includes four liquid product conduits 32-35 (liquid product conduits 33 and 35 are not shown) operably connected to each of the product inlet ports 18-21 (and two not shown). Further details and written description describing the various features, functions and structure of the dispenser, in the case where dispenser 22 comprises an aspirating dispenser, are further described in application Ser. No. 11/206,618 discussed above.

In one leg of the dispenser 22 liquid product 80 from liquid product container 48 may be provided to dispenser 22 via liquid product conduit 34 using a peristaltic pump 96. The peristaltic pump 96 (p-pump) includes an inlet 98 connected in fluid communication to the liquid product container 48 and an outlet 100 connected in fluid communication with a product inlet port 20 of dispenser 22. Optionally, a flow meter assembly identical to flow meter assembly 36 or 37 may be configured in-line to the flow path of liquid product conduit 34. Recognizing that p-pumps have a tendency to create a back pulse in the conduit 34 upon initial compression of the tubing in the pump, the flow meter assembly 37-38 shown in FIG. 1B may be connected in-line to conduit 34 to prevent the back pulse from reaching and counter-rotating the rotors in the flow meter. As discussed above, the tubing 110 and check valve 112 on the downstream side of the meter mitigate the back pulse by minimizing or preventing back flow using the check valve 112 and absorbing the back pulse using the tubing 110. The present invention further contemplates that a flow meter assembly may be configured in the liquid flow path of any liquid input to the dispenser 22 and connected to controller 12. Regardless of the type of liquid input or how the liquid product is processed or dispensed, flow meter assemblies may be positioned in-line with the flow path of each liquid input to the dispenser 22. Each flow meter assembly would be connected to controller 12 by connectors, such as by wired connectors 14 and 15. Additionally, each flow meter assembly may be configured with the optimal flowrate sensitivity depending upon the liquid input being monitored. For example, a flow meter having an appropriate flowrate sensitivity may be placed in-line to conduit 66 for measuring the volumetric flow of liquid diluent passing through conduit 66 into dispenser 22. Similarly, a flow meter assembly having an appropriate flow meter sensitivity may be placed in-line to the liquid product conduit 32, or other liquid input to dispenser 22, for measuring the volumetric flow of liquid product 78 from liquid product container 50 into dispenser 22.

During the initial setup and on-going operation of dispensing system 10, liquid flow information communicated from each flow meter assembly 36-37 to controller 12 allows the installer or technician to verify that the correct amount of liquid product 78 and 80 is being dispensed relative to the liquid diluent (e.g., the dilution ratio). During a liquid product dispensing event, liquid flow information (e.g., the volumetric flow rate) is communicated from each sensor 94-95 of each flow meter assembly 36-37 and any optional flow meter assemblies connected to controller 12. During a dispensing event, solenoid valve 56 opens to allow liquid diluent to pass through conduit 66 to dispenser 22. Flow meter assembly 36 monitors the flowrate of liquid diluent passing through conduit 66. The liquid flow information, or volumetric flow of the liquid diluent, is communicated from the flow meter assembly 36 to controller 12 via connector 14. Communication of liquid flow data may be accomplished using either wired or wireless connections. Likewise, liquid product 78 is drawn from liquid product container 50 into dispenser, and both are dispensed through outlet conduit 68 to an end use application such as a warewashing or laundry appliance. The processor aboard the controller 12 uses the liquid flow data from both flow meter assemblies 36-37 to calculate a dilution ratio for the liquid product being dispensed to the end-use application. Additional data, such as flow rate, total consumption, ounce/gallon readings, may also be acquired from the liquid flow information measured by the flow meter assemblies 36-37. Date time stamps may also be applied to data upon acquisition.

The controller 12 may also be connected in operable communication with the dispenser 22 and/or peristaltic pump 96 for altering the rate at which liquid product 78 and 80 are dispensed from dispenser 22. Using controller 12, the amount of liquid product being dispensed may be increased or decreased to ensure that the use solution or mixed solution dispensed via outlet conduit 68 to an end use application is being dispensed at the correct concentration or dilution ratio. Real-time monitoring of the dilution ratio may be provided on the display 16 of controller 12. Thus, the controller 12 may monitor, process and store liquid flow information received from each of the flow meter assemblies 36-37, and any additional flow meter assemblies connected to a liquid input leg of the dispenser, for calibrating and providing on-going audits of the dispensing system 10. Liquid flow information or data acquired from each of the flow meter assemblies 36-37 (and others not shown), whether processed or raw, may be stored aboard the controller 12 in a data store 104 for subsequent download to a PC or other electronic device. Liquid flow information may also be date time stamped viewed in real-time or stored for subsequent analysis. Furthermore, controller may include a link for uploading liquid flow information to a network or other system for real-time or post monitoring of the behavior of the dispensing system 10 by a company or technician. The controller 12 is also able to alert or provide notifications via display 16, or a network or other connection to allow an operator, user or technician to be apprised of the operating status of the dispensing system 10. For example, if the dilution ratio of a liquid product falls outside of the tolerable dilution ratio for that specific liquid product, the controller 12 may be configured to apprise the operator, user or technician of the malfunction and the subsequent need for service. This historical information or liquid flow data may be saved in a data store 104 aboard the controller 12 for subsequent evaluation or use in making business decisions relating to the dispensing system 10 or the dispensing account. Using the controls 17 of controller 12, a user, operator or technician may gain access to liquid flow data acquired by each of the flow meter assemblies 36-37 (and those not shown). Through the controls 17 aboard controller 12, a user, operator or technician may alter the amount of the liquid input relative to the liquid diluent to adjust or alter the dilution ratio. In another aspect of the invention, the controller 12 may be undocked from the dispensing system and connected via a wire or wireless connection to a PC or other electronic device for downloading, saving or uploading liquid flow information from the flow meter assemblies 36-37 (and others not shown) for subsequent evaluation, and use in making business decisions relating to the dispenser, dilution ratio of the liquid product or the type of liquid product being used. In the case of connection to a pump dosed product (such as a p-pump, diaphragm pump, piston pump, gear pump, etc.), the controller may also be configured to auto calibrate on start up and auto control while running. A technician may use the real-time feedback to dial in the correct dilution rate during calibration/audit. Alternatively, by auto-control, or manual control by operator input, the controller 12 may use the real time feedback to adjust the dispenser to achieve the desired dilution rate.

FIGS. 4A-B are schematic representations of the present invention used in a commercial laundry system. A laundry system is one type of commercial application contemplated by the present invention. Other commercial applications such as a warewashing system or an on-site formulator are also contemplated. As previously discussed, the tool 11 may be used as a portable device for monitoring, calibrating and auditing liquid dispensing systems on an on-going basis. FIGS. 4A-B illustrate the use of tool 11 shown in FIG. 1A-B respectively to monitor, calibrate and audit dispensing system 10. For example, tool 11 may be used during the initial installation of dispensing system 10 to calibrate each of the liquid inputs to the dispenser 22 to ensure that each input is being dispensed to the end use application at the correct dilution ratio. Like the dispensing system shown in FIG. 3, the dispensing system shown in FIGS. 4A-B includes a dispenser 22 having product inlet ports 18-21 (product inlet port 21 not shown). The product inlet ports 18-21 are connected to liquid product containers 48-51 via liquid products conduits 32-35. Each liquid product container 48-51 houses a liquid product 78-81. Each liquid product 78-81 constitutes a liquid input to the dispenser 22. A flow meter assembly 36 or 37 may be placed in-line to the flow path of a liquid product conduit 32-35. For example, as shown in FIG. 4B, in the case where product in the liquid product conduit 32-35, liquid in the liquid conduit 66 or liquid and/or product in the outlet conduit 68 experiences pressure pulses, and specifically back pulses, the flow meter assembly 37-38 shown in FIG. 1B or FIG. 1C may be used to mitigate or prevent the back pulse from reaching and causing the rotors 46-47 and 82-83 to reverse rotate. As discussed above, the tubing 110 and check valve 112 on the downstream side of the meter mitigate the back pulse by minimizing or preventing back flow using the check valve 112 and absorbing the back pulse using the tubing 110. In the case of the meter shown in FIG. 1C, which may be used alone or in combination with a check valve, the bladder 114 absorbs the back pulse to prevent it from counter rotating the rotors and providing a false reading. For example, a p-pump 96 has a tendency to create back a pressure pulse each time the tube in the pump is compressed. This back pressure pulse, if allowed to counter rotate the rotors of the meter, would result in the flow meter producing an inaccurate reading. In the case where line pressures are generally consistent or constant, the flow meter assembly 37-38 shown in FIG. 1A may be used to acquire liquid flow information.

A suitable controller 70 provides a low voltage connection to the solenoid valves 28-31 (solenoid valve 31 not shown) and p-pump 96 through an electrical connection 74. The controller 70 receives a signal via connection 72 from the appliance 76, such as a laundry machine. The outlet conduit 68 of the dispenser 22 is connected in fluid communication to the appliance 76 to dispense a solution to the appliance. The appliance 76 sends a signal to controller 70. Based on the desired liquid product being requested by the appliance 76, an instruction is sent from the controller 70 through electrical connection 74 to actuate one of the solenoid valves 28-31. The requested liquid product 78-81 is drawn from a liquid product container 48-51 and through a liquid product conduit 32-35 into dispenser 22. The present invention also contemplates that the controller 70 could be configured to pulse a solenoid valve 32-35 connected to dispenser 22 to control the dilution rate. Varying the pulse rate can vary the end use dilution concentration. The liquid product and liquid diluent received from the liquid diluent source 54 is dispensed through an outlet port of the dispenser 22 into the appliance 76 via outlet conduit 68. Although dispensing system 10 illustrated in FIGS. 4A-B illustrates the features of a particular dispensing system, such as an aspirated dispensing system, the tool 11 of the present invention contemplates use with any type of dispensing system. For example, the tool 11 could be used to monitor, calibrate and audit, on an on-going basis, any type of dispensing system where liquid inputs to the dispensing system are dispensed to an end use application and there exists a desire to control a dilution ratio or concentration for a liquid input being dispensed to the end use application. The tool 11 could also be used to monitor, calibrate and audit, on an on-going basis and in real-time, any dispensing parameter extractable from the liquid flow information acquired by the flow meters 37-38 connected in-line to a liquid carrying member of the dispensing system. As discussed above, the liquid flow information could include the flow rate, total amount dispensed, total amount consumed, date and time of the readings, etc. The liquid flow information could be used by controller 12 to control and provide input to controller 70 operating the dispensing system 10. For example, tool 11 could be used to audit each dispensing event. The liquid flow information could be used by controller 70 to verify that the dispensing system 10 is operating properly, and if not, the liquid flow information could be used for making real-time corrections to each dispensing event until the event matches the system's desired operating parameters. Additionally, the liquid flow information could be recorded and used by an on or off-site user, operator or technician to monitor and make adjustments to the controller 70 and/or dispensing system 10 as needed.

Whether during the initial setup of the dispensing system or checking operation of the dispensing system on an on-going basis or over time, the tool 11 may be used to monitor, calibrate and audit the dispensing system to ensure that the liquid and concentration of solutions being dispensed to the end use application, such as a warewashing or laundry appliance, are correct. As each flow meter assembly 36-37 includes a quick connector 90-93 (shown in FIGS. 1A-B) each flow meter assembly 36-37 may be connected in-line of the flow path to any liquid input to the dispensing system 10. For example, flow meter assembly 36 may be connected in-line to the flow path of conduit 66 and flow meter assembly 37 connected in-line to the liquid flow path of liquid product conduit, such as conduit 34. During a dispensing cycle of liquid product 80 from liquid product container 48 through liquid product conduit 34, flow meter assembly 37 acquires liquid flow data which is in-turn communicated to controller 12. Similarly, during the same dispensing cycle, liquid flow data is communicated from flow meter assembly 36 to controller 12 for the liquid diluent passing through conduit 66 into the inlet 23 of dispenser 22. Controller 12 compares the liquid flow information received from the flow meter assemblies 36-37 to derive a dilution ratio between the liquid diluent being introduced into the dispenser 22 through conduit 66 and the liquid product 80 being dispensed into the dispenser 22 by peristaltic pump 96. If the dilution ratio of the liquid product being dispensed to the end use application is inaccurate or not within the normal bounds for a dilution ratio specified for the particular product, the dispenser 22 and/or peristaltic pump 96 may be adjusted so that the correct dilution ratio is achieved. Because the flow meter assemblies 36-37 are connected in-line during the calibration and auditing processes, any changes to the dispenser 22 or peristaltic pump 96 may be done in real-time, and the subsequent effect to the dilution ratio may be monitored via the display 16 on controller 12. Each leg of the dispensing system may be calibrated and audited in a similar fashion. This may be done by disconnecting quick connector fittings 90-93 of one of the flow meter assemblies 36-37 from one liquid input to the dispenser 22 and connecting to another liquid input line. Before disconnecting, the flow meter 42 or 43 may be flushed or rinsed to prevent cross-contamination. The controller 70 may be configured with a rinse mode/cycle whereby water is flushed through the liquid input line to which the flow meter assembly 36-37 is connected. The controller may also be configured to control the volumetric flow of rinse liquid, such as by control of the water solenoid valve 56, through the flow meter 42-43 so as to not harm a flow meter having a low volumetric flow rate. The dispenser 22 is operated again and the dilution ratio of the liquid product is monitored, and changes are made in real-time to the dispenser 22 or peristaltic pump 96 for adjusting the dilution ratio. The controller 12 may also be used to provide a proof of dose or delivery of a liquid product to an end use application. Each flow meter assembly 36-37 may be connected to a liquid input leg of the dispenser so as to monitor the volumetric flow of liquid passing through each leg of the dispenser and into the end use application. Using this procedure, one is able to verify that a specific amount of liquid product has been delivered to the end use application. In the case where flow meter assembly 36 is connected in-line to the liquid diluent leg of the dispenser and flow meter assembly 37 is connected in-line to a liquid product leg of the dispenser, each flow meter assembly may be a specific type with a specific volumetric flow sensitivity. For example, the flow meter assembly 36 connected in-line to the liquid diluent leg of the dispenser may comprise an oval gear meter wherein the flow information for the liquid input is captured by sensor 94 using a magnetic pulse count. Likewise, the flow meter assembly 37 used to acquire liquid flow data from the liquid product line of the dispenser may comprise an oval gear meter wherein flow information for the liquid product input is captured by sensor 95 using an optical pulse count. Here, the optical pulse count oval gear meter has a higher sensitivity, can use smaller gears and has a higher rpm allowability than the magnetic pulse count oval gear meter. Depending upon the desired sensitivity, a flow meter having the appropriate sensitivity may be selected and used with tool 11. Processed or raw flow information data stored or received by controller 12 may be used to monitor and perform ongoing audits of the dispensing system 10. For example, flow information data acquired using each of the flow meter assemblies 36-37 may be used to provide future service or updates to the dispensing system 10. Flow information data may also be used by a company to make business decisions relating to the liquid products being used in combination with certain types of dispensers and the appropriate dilution rate for each particular liquid product depending upon its end use application. The tool 11 allows liquid flow information from multiple accounts to be acquired and communicated to a remote location in real-time. The liquid flow information tagged with date time stamp information may then be used to monitor and perform audits of multiple dispensing systems at a single or multiple locations. The liquid flow information acquired by the tool 11 may be recorded on a local data store 104 aboard the controller 12 and/or communicated to one or more other locations for real-time or post processing, monitoring and auditing.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of acquiring and utilizing liquid flow information of a dispenser, comprising:
    connecting a flow meter to the dispenser;
    dampening in-line pressure pulses with the flow meter;
    operatively connecting the flow meter to a controller having a storage, a communication means, and a processor; and
    during operation, transmitting liquid flow information from the flow meter to the controller, wherein at least some of the liquid flow information is stored at the storage of the controller.

2. The method of claim 1, further comprising displaying the liquid flow information on a display of the controller in real time.

3. The method of claim 2, further comprising displaying historical liquid flow information on the display of the controller to compare the real time liquid flow information with the historical liquid flow information.

4. The method of claim 1, wherein the liquid flow information that is stored at the storage of the controller is used to assess a current or future use of the dispenser, liquid product effectiveness, or business decisions relating to a dispensing system.

5. The method of claim 1, wherein the liquid flow information that is stored at the storage of the controller comprises a time stamp.

6. The method of claim 1, further comprising communicating the liquid flow information to an external device remote of the dispenser.

7. The method of claim 6, wherein the communication means of the controller comprises a transmitter and receiver for transmitting liquid flow information and receiving liquid flow information between the controller and the external device.

8. A method of utilizing liquid flow information of a dispenser, comprising:
    operating the dispenser including a flow meter connected in fluid communication with the dispenser;
    acquiring, via a sensor, data associated with liquid flow through the flow meter;
    communicating the data to a controller having a storage;
    receiving and displaying liquid flow information with the controller; and
    reviewing the data communicated to the controller to determine information related to the liquid flow of the dispenser;
    wherein the liquid flow information is a dilution ratio comprising an amount of a liquid product communicated to the dispenser relative to an amount of a liquid diluent communicated to the diluent dispenser.

9. The method of claim 8, further comprising transmitting the data from the controller to an external device for review.

10. The method of claim 8, wherein the step of reviewing the data comprises analyzing the data to assess current and future use of the dispenser, liquid product effectiveness, or business decisions relating to a dispensing system.

* * * * *